Nov. 25, 1924.  1,517,155

H. R. GUYOT

RADIATOR WITH REMOVABLE ELEMENTS

Filed Jan. 29, 1921  6 Sheets-Sheet 1

INVENTOR
Henri R. Guyot
BY
ATTORNEYS

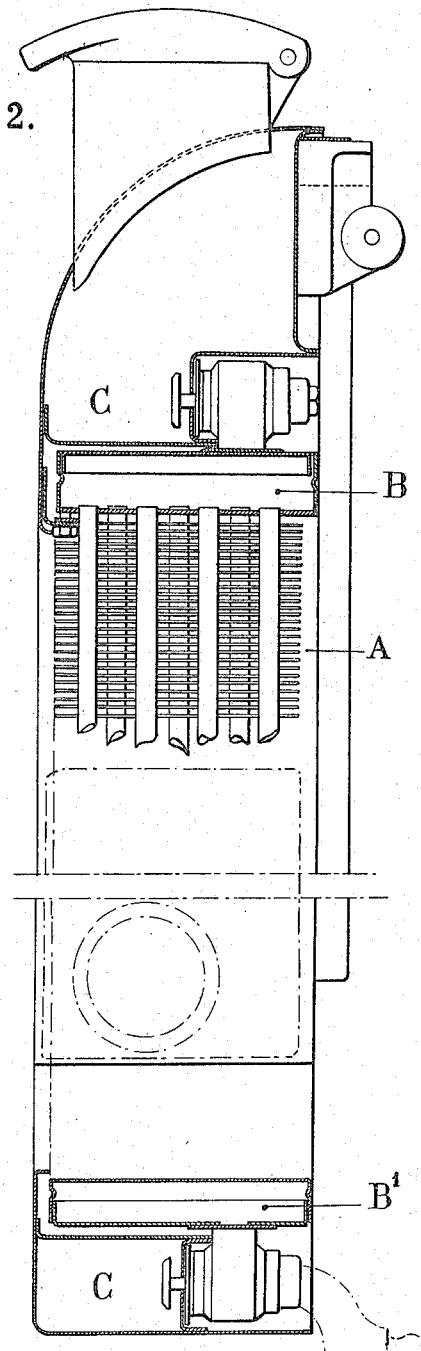

Nov. 25, 1924.

H. R. GUYOT 1,517,155

RADIATOR WITH REMOVABLE ELEMENTS

Filed Jan. 29, 1921  6 Sheets—Sheet 5

INVENTOR
HENRI R. GUYOT
BY
ATTORNEYS

Nov. 25, 1924.
H. R. GUYOT
1,517,155
RADIATOR WITH REMOVABLE ELEMENTS
Filed Jan. 29, 1921
6 Sheets—Sheet 4
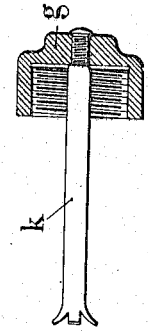
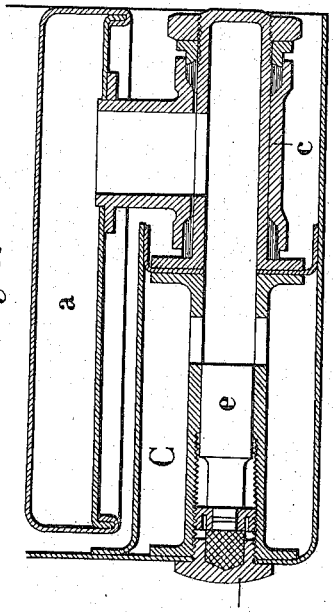
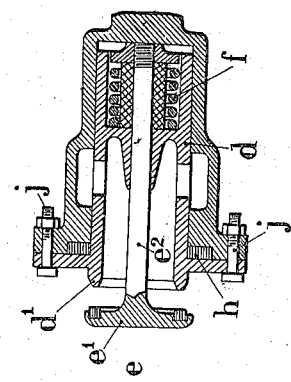
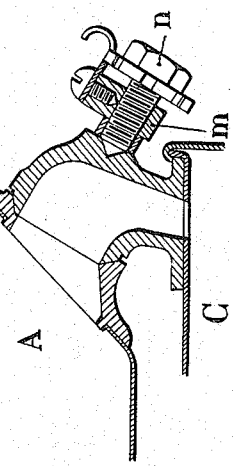
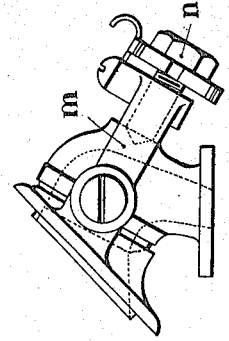
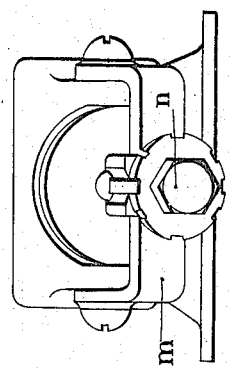
INVENTOR
HENRI R. GUYOT
BY
ATTORNEYS

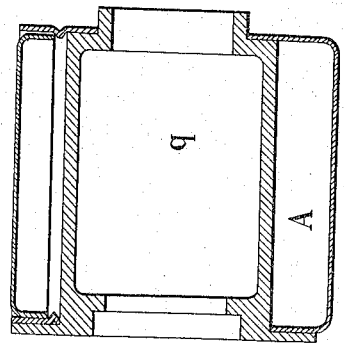
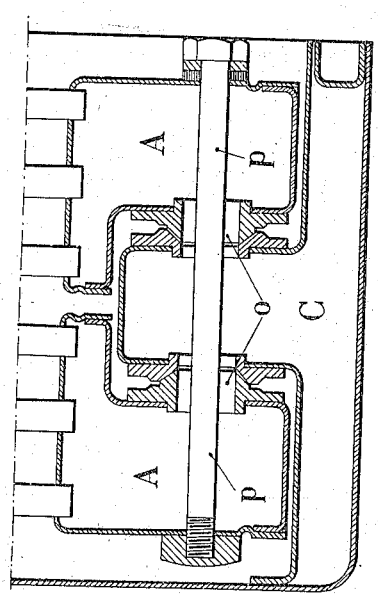
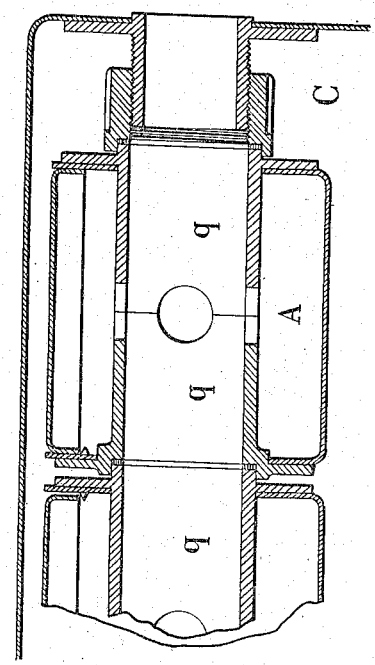
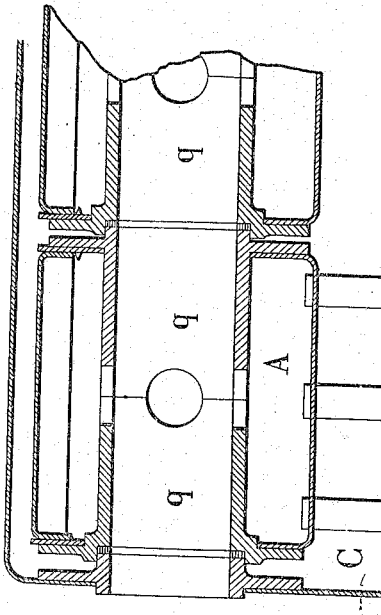

Nov. 25, 1924.

H. R. GUYOT

RADIATOR WITH REMOVABLE ELEMENTS

Filed Jan. 29, 1921   6 Sheets-Sheet 6

1,517,155

INVENTOR
HENRI R. GUYOT
BY
ATTORNEYS

Patented Nov. 25, 1924.

1,517,155

UNITED STATES PATENT OFFICE.

HENRI RAYMOND GUYOT, OF PARIS, FRANCE.

RADIATOR WITH REMOVABLE ELEMENTS.

Application filed January 29, 1921. Serial No. 441,045.

*To all whom it may concern:*

Be it known that I, HENRI RAYMOND GUYOT, a citizen of the Republic of France, residing at 54 Avenue Jean Jaures, Paris, France, have invented a Radiator with Removable Elements, of which the following is a full, clear, and exact description.

This invention has for its object a motor car radiator or the like, characterized by the fact that it comprises removable elements which are retained in the frame of the radiator in a special manner, in order to allow of taking them out and of replacing them in case of accident.

This radiator, with its removable elements, allows anyone to replace instantaneously a leaking or injured element without any difficulty; moreover, this element can be separated from the complete assembly of elements if necessary, even when on the road.

The invention will be described hereafter with reference to the accompanying drawing in which:

Fig. 2 is a cross vertical section through one of the removable elements;

Fig. 4 is a modification of the connecting device illustrated in Fig. 3;

Fig. 6 shows another form of one of the members of the modification illustrated in Fig. 5;

Fig. 8 shows in cross vertical section another modification of the above connecting device;

Figs. 10, 11 and 12 are respectively a front view, a side view and a section of another modification of the said connecting device;

Fig. 13 shows a connecting device for double elements;

Fig. 14 illustrates elements assembled end to end by means of a sleeve device;

Fig. 15 shows a connecting device comprising a sleeve in one piece;

Figure 1:
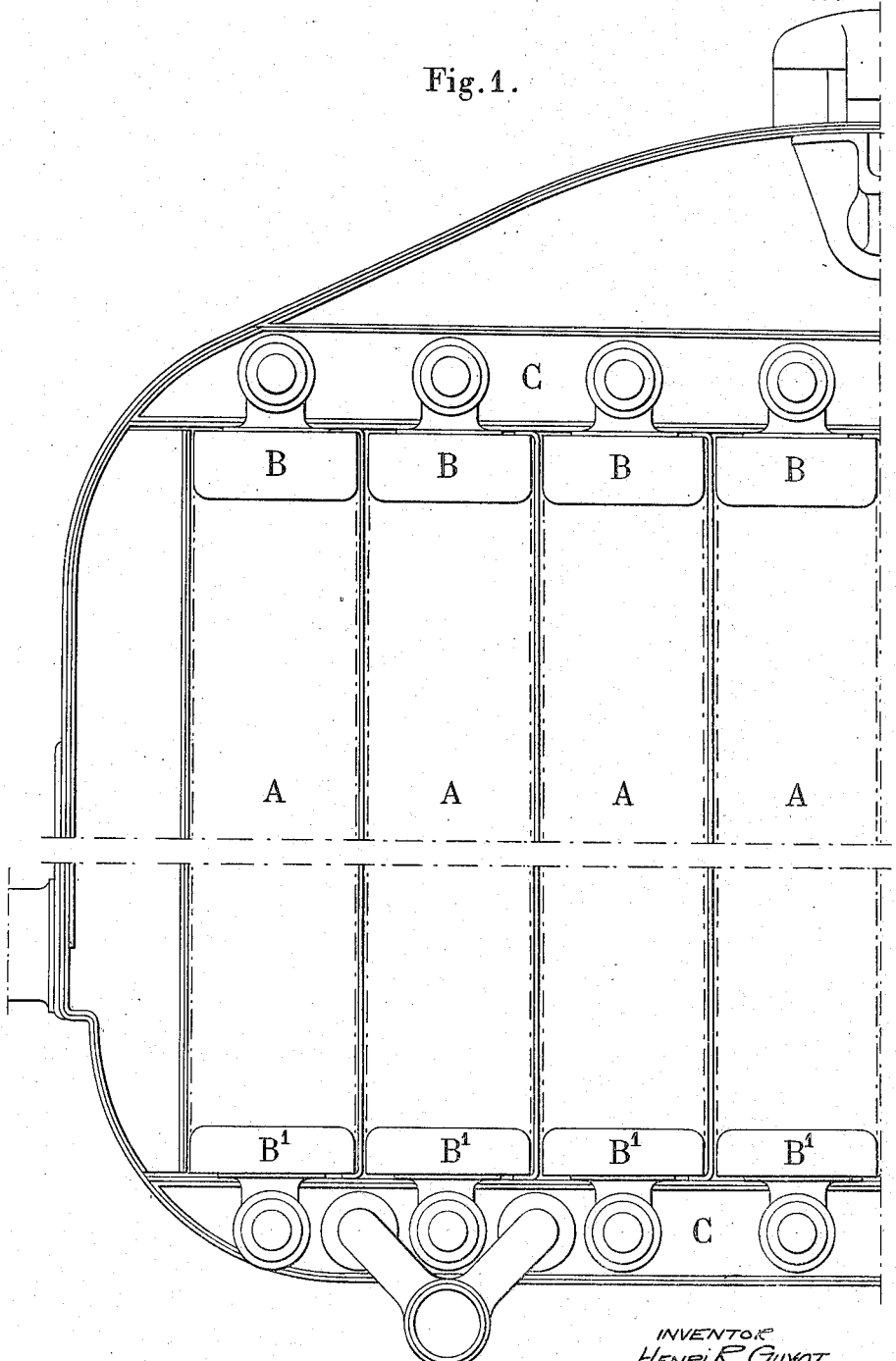
Fig. 1 is a partial front view of a radiator with removable elements.

As illustrated in the drawings, Figs. 1 and 2, this radiator comprises removable elements A, which may be of any system whatever, comprising an upper header B and a lower header $B^1$ on which are fitted a special connecting device which permits ready removal and renewal of the elements.

Figure 3:
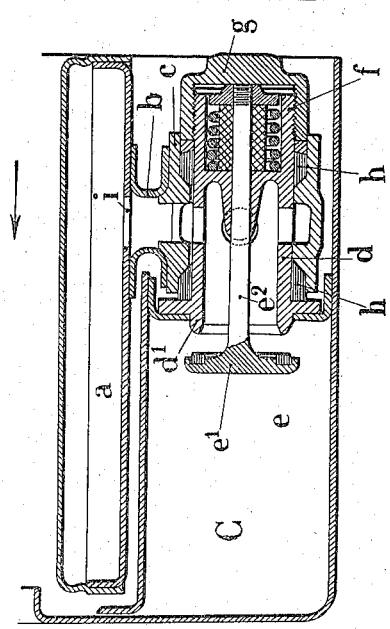
Fig. 3 is a cross vertical section of one form of the device for connecting the removable elements with the body of the radiator.

In the form of removable element, illustrated in Fig. 3, the structure comprises headers $a$ provided with a neck piece $b$ and a horizontal sleeve $c$ slidably fitting on a hollow valve casing $d$ provided with a valve $e$ opening in the header C of the radiator closed by walls. This hollow casing $d$ is fixed and constitutes a part of the header of the radiator.

The valve $e$ comprises a valve head $e^1$, a valve rod $e^2$ and a spring $f$ adapted to cause the closing of the valve.

When the elements are placed in position after causing them to pass in the direction indicated by the arrow, Fig. 3, a cap-nut $g$ is screwed home until two flexible annular packings $h$ are compressed. Simultaneously, the valve $e$ is opened and the header $a$ of the element communicates through ports $i$ with the header C of the radiator.

If it is desired to separate the element from the radiator, it is simply necessary to unscrew the cap-nut $g$, thus enabling the returning spring $f$ to close the valve upon its seat $d^1$, so that the communication between element and the header C of the radiator is cut off.

In the modification illustrated in Fig. 4, the arrangement comprises only one annular packing $h$. Moreover, the nut $g$ is replaced by studs $j$.

Figure 5:
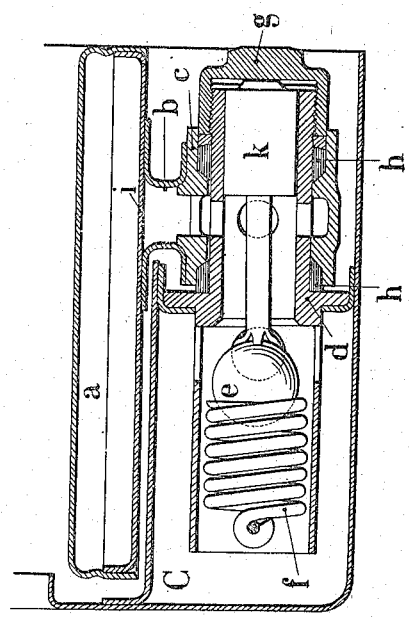
Fig. 5 shows in cross vertical section a modification of the above connecting device provided with a ball valve.

In the modification illustrated in Fig. 5, the valve $e$ is a ball valve. The ball $e$ acting as a valve is actuated, when it is to be opened, by a rod $k$ pushed by the cap-nut $g$. This modification is actuated and works automatically as above set forth.

The rod $k$ might be made integral with the cap-nut $g$, as illustrated in Fig. 6.

Figure 7:
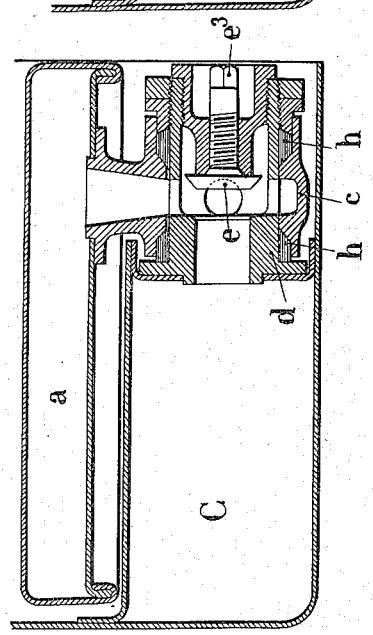
Fig. 7 illustrates in cross vertical section a modification of the above connecting device.

In the modification illustrated in Fig. 7, the valve $e$ is a tapered valve with a screw threaded opening rod. It is not an automatically closing valve, but it is actuated by hand by means of a socket wrench fitted on the square part $e^3$.

In the modification illustrated in Fig. 8, the valve $e$ is a reciprocatory piston valve. The reciprocatory piston is actuated by hand by means of an exterior screw knob $l$.

Figure 9:
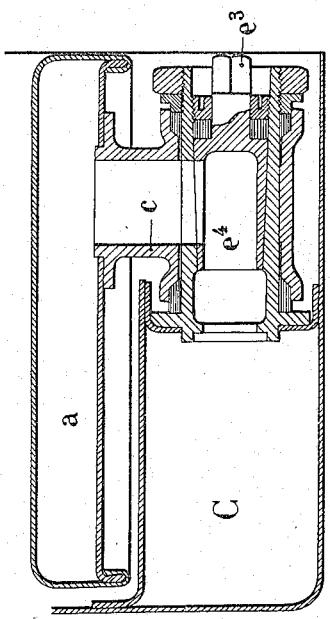
Fig. 9 is a cross vertical section of another modification of the said connecting device.

In the modification shown in Fig. 9, the valve is a turning plug cock $e^4$ actuated by hand by means of a socket wrench fitted on the square part $e^3$.

Figures 10, 11 and 12 illustrate a modification of connecting device which is provided with a male member, a female member, and with a yoke $m$ and a clamping screw $n$ serving for the assemblage of the elements A on the radiator.

Fig. 13 shows a connecting device for double elements A A. This device comprises conical packings $o$ arranged to the right and to the left and placed in the reverse direction from each other, the whole being held on the radiator by a bolt $p$.

Fig. 14 shows elements A assembled end to end by means of sleeves $q$ made in two parts.

Fig. 15 shows a connecting sleeve $q$ made in one piece.

Figure 16:
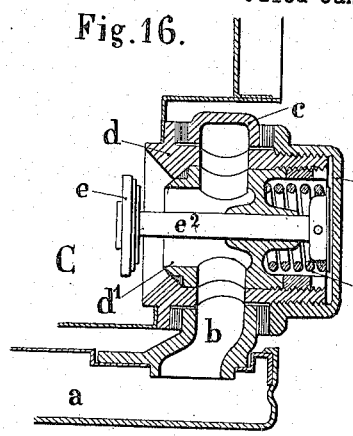
Fig. 16 is a section of a modification of the device connecting the removable elements with the body of the radiator.

In the modification illustrated in Fig. 16, the seat $d^1$ of the valve (Fig. 3) is removable.

Figure 17:
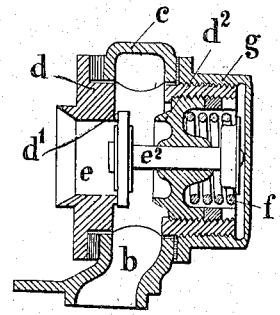
Fig. 17 is a section of another modification of this device.

In the modification illustrated in Fig. 17, the valve $e$ is a double action valve, that is to say that by unscrewing the cap-nut $g$ the liquid inlet is opened, but at the same time, the valve bears upon another seat $d^2$ so as to isolate or shut off the spring $f$ from the water in the radiator header C.

Figure 18:
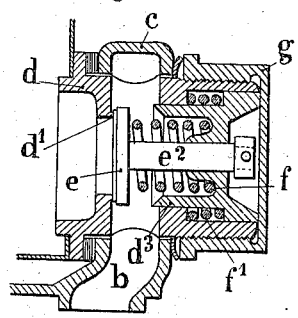
Figs. 18 and 19 are sections of a modification of the connecting device in its closed and open position.
Figure 19:
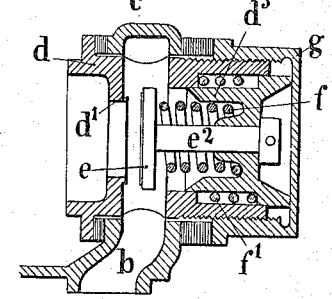

In Figs. 18 and 19, the valve is carried by a movable member $d^3$ returned by a spring $f^1$, so that by unscrewing the nut $g$, the spring $f^1$ brings back the valve and opens the liquid inlet, as illustrated in Fig. 19.

Figure 20:
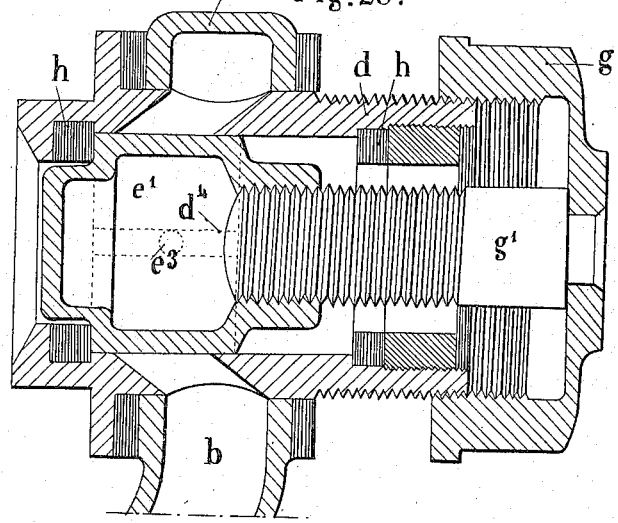
Fig. 20 is a section of a modification of the connecting device in the closed position.

In the modification shown in Fig. 20, the closing of the liquid inlet is obtained by a double action obturating piston valve $e^1$ actuated by a screw $g^1$ integral with the nut $g$.

The screw $g^1$ and the nut $g$ have screw threads of reverse direction, so that by unscrewing the nut $g$ for instance, the piston $e^1$ is brought rearward for giving passage to the liquid and by screwing up the said nut the valve is closed for cutting off the admission of the liquid.

In both extreme positions, the obturating piston valve $e^1$ bears upon soft annular liners $h$.

A claw $e^3$ fitting in a slot $d^4$ prevents the piston $e^1$ from rotating during its movements.

The forms, details, accessories, materials and dimensions of the above devices may of course be varied without departing thereby from the principle of the invention.

Claims:

1. A radiator comprising headers carrying valve casings and having elements which are independently removable, said elements including a connecting device consisting of a sleeve rigidly secured to the element, said valve casings housing a spring valve, and a cap nut adapted to maintain the said sleeve on the valve casing and to cause the opening of the valve when the element is put in position.

2. A radiator comprising headers carrying valve casings, and intermediate independently removable radiating elements, said elements provided with headers at each end having sleeve members adapted for slidable connection with said valve casings, a reciprocating valve in said casing, and a cap nut adapted to cooperate with each valve casing to connect and disconnect the element headers with the valve casing and to open and close the valve therein, said valve and cap nut being coaxial.

3. A radiator comprising headers carrying valve casings, and intermediate independently removable radiating elements, said elements provided with headers at each end having sleeve members adapted for slidable connection with said valve casings, a reciprocating valve in each of said casings, a removable valve seat in each of said casings, and a cap nut cooperating with each casing to connect and disconnect the element headers with the valve casings and to open and close the valves therein, said valve and cap nut being coaxial.

4. A radiator comprising headers carrying valve casings and intermediate independently removable radiating elements, said elements provided with headers at each end having sleeve members adapted for slidable connection with said valve casings, a reciprocating valve in each of said casings, a spring controlled valve carrier in each of said casings mounting said reciprocating valve, and a cap nut adapted to cooperate with each valve casing to connect and disconnect the element headers with the valve casings and to open and close the valves therein, said valves and cap nuts being coaxial.

The foregoing specification of my "radiator with removable elements" signed my me this 14th day of January, 1921.

HENRI RAYMOND GUYOT.